(No Model.) 2 Sheets—Sheet 2.
J. L. MOTT, Jr.
PIGEON TRAP.
No. 544,186. Patented Aug. 6, 1895.
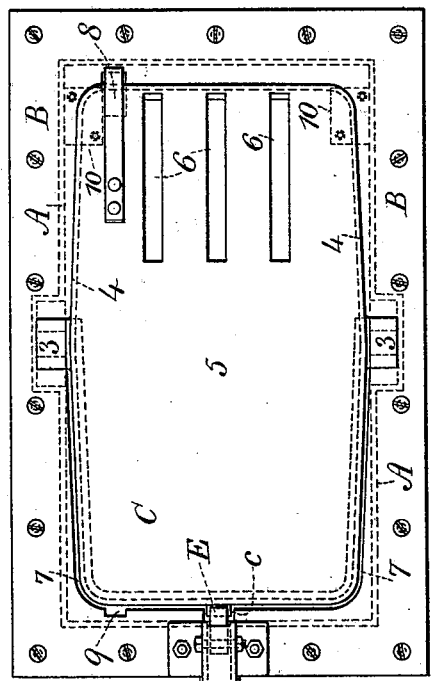
Fig. 5.
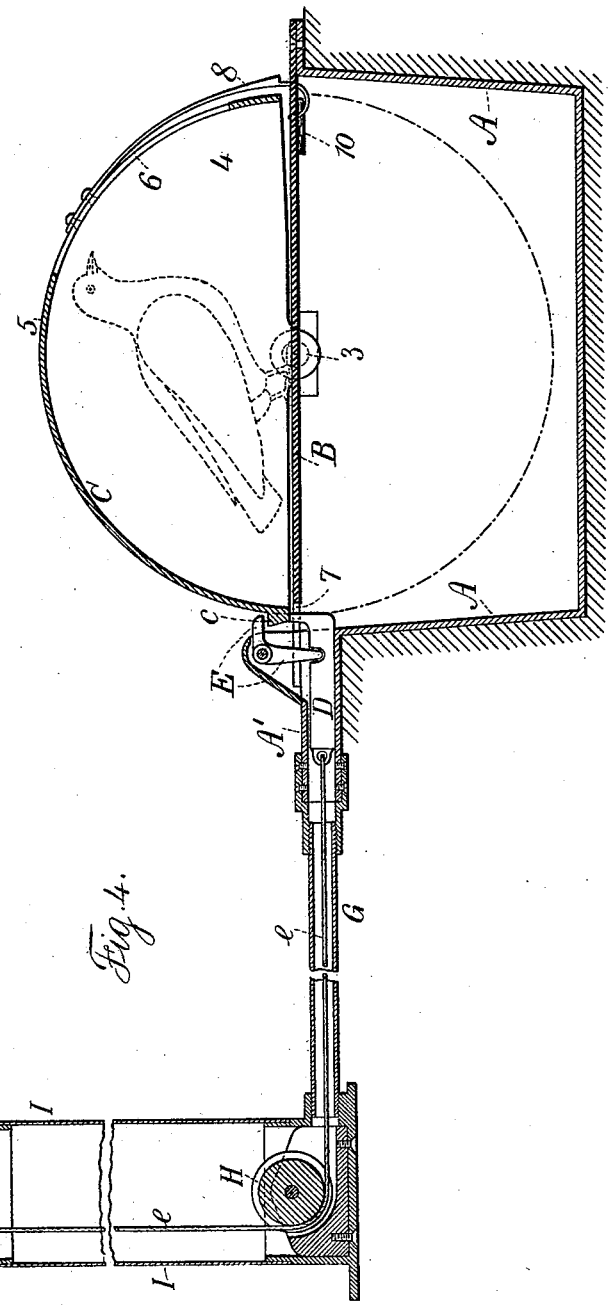
Fig. 4.
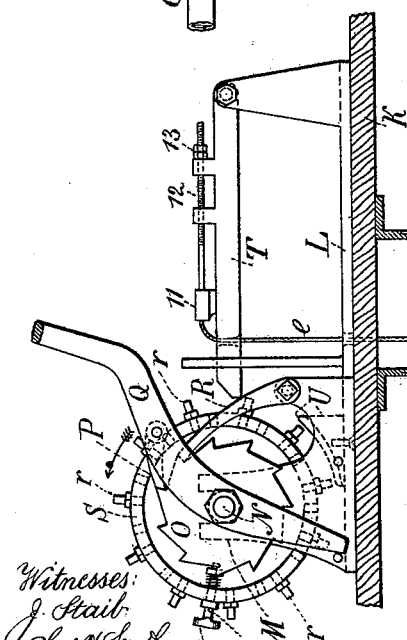
Witnesses:
J. Staib
Chas H Smith
Inventor:
Jordan L. Mott Jr.
per Lemuel W. Serrell
Atty

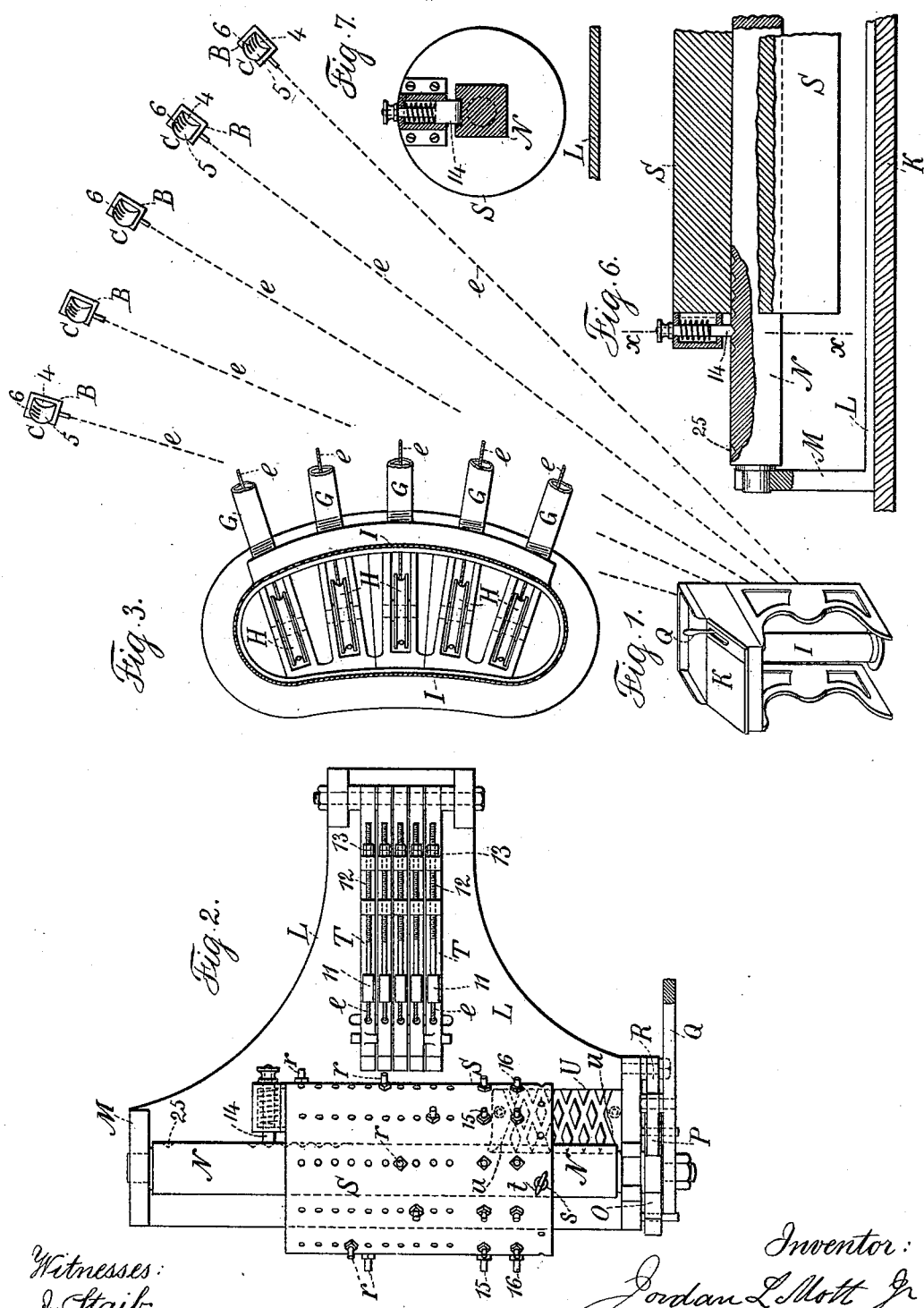

UNITED STATES PATENT OFFICE.

JORDAN L. MOTT, JR., OF NEW YORK, N. Y.

PIGEON-TRAP.

SPECIFICATION forming part of Letters Patent No. 544,186, dated August 6, 1895.

Application filed March 20, 1895. Serial No. 542,526. (No model.)

*To all whom it may concern:*

Be it known that I, JORDAN L. MOTT, Jr., a citizen of the United States, residing in the city, county, and State of New York, have invented an Improvement in Pigeon-Traps and Trap-Pulling Devices, of which the following is a specification.

Pigeon-shooting is often indulged in for obtaining accuracy in marksmanship upon a moving object, and in the traps or other devices for holding the pigeons difficulty has often been experienced in starting the pigeons with rapidity and reliability.

The object of the present invention is to confine the pigeon by a movable cover that receives a partial rotation and in completing its movement produces a concussion and noise beneath the pigeon in such a manner as to immediately start the same and cause it to fly, and a number of these traps are arranged and actuated by the starter in such a manner that the marksman cannot know from which trap a pigeon will be liberated, and hence there is no risk of collusion between the starter and the marksman, and all persons practicing pigeon-shooting have a similar opportunity and neither one can be favored more than another in starting up the pigeons.

In carrying out this invention a hollow semicylindrical cover or hood is provided with sufficient openings for the bird to remain in the light, and this cover is pivoted, so that when one edge of it is pushed down, a complete movement is caused by gravity, and the edge of the cover strikes beneath the plate upon which the bird stands, making considerable noise and jar and causing the bird to immediately fly. These traps are connected by wires or wire ropes to a starting apparatus, in which a rotary device is employed having movable pins that act upon the connections to the respective traps, so that any desired number of birds can be liberated either successively or simultaneously, and the starting apparatus is distant from the traps and out of the way of the marksman.

In the drawings, Figure 1 is a general perspective indicating the relative positions of the different portions of the apparatus. Fig. 2 is a plan view of the starting-cylinder detached from the desk or case. Fig. 3 is a sectional plan view representing the pulleys at the lower part of the starting apparatus. Fig. 4 is an elevation showing the starting device and its connection with the trap, the said trap being in section. Fig. 5 is a plan view of the trap. Fig. 6 is a partial section of the pin-cylinder and shaft; and Fig. 7 is a cross-section at the line $x\ x$, Fig. 6.

It is usually advantageous to place the trap so that the pigeon or bird is at or near the level of the ground, and with this object in view the box A is adapted to be inserted in the ground with the top plate B at or near the surface, and upon this top plate the bird is placed and the hood C turned over such bird, and this hood C is pivoted at 3 and it is made substantially semicylindrical, having sides 4 and a semicircular cover or connection 5, and there are openings at 6 to admit light freely to the bird, and these openings 6 are to be at the side of the hood which is distant from the marksman, so that the birds in the traps will be protected from stray shot.

In the top plate B is an opening at 7, so that the hood C can be freely swung upon its pivots 3 and pass down into the box A and beneath the top plate B, the hood swinging about one hundred and eighty degrees, so as to pass completely down into the box A, and by the momentum the advancing edge of the hood will strike forcibly against the under side of the top plate B, producing a noise and concussion and at the same time uncovering the bird, so that the bird will be sure to fly upwardly the moment the hood is swung, and in consequence of the openings 6 for the admission of light being on the far side of the hood the bird will usually face the light, and hence fly from the marksman.

It is usually advantageous to swing the hood C in one direction by hand in covering the bird and to swing it in the other direction by the automatic means hereinafter described.

I provide a spring-latch 8, which preferably is made with a loop at the moving end, and when the cover has been swung down into the box to uncover the bird the spring 8 passes into the notch 9 and the latch catches beneath the top plate of the box to prevent any rebound of the hood, and when the hood is to be swung out of the box and over the bird the spring 8 is unlatched by the hand applied to the loop at the end of the spring, and then the hood is swung over the bird while upon the top plate of the box. A piece of rubber or of wood may be applied at the under side of the cover of the box, as at 10, for the advancing end of the cover or hood to strike against, so as to prevent injury to the parts.

The bolt D is within a hollow arm A', projecting from the box A, and such bolt D comes under the edge of the hood C, and there is a pivoted finger E, one end of which passes into a notch in the bolt D and the other end is above the projection c upon the edge of the hood C. Hence when this bolt D is pulled back the horizontal end of the finger E acts upon the projection c and pushes this end of the hood C downwardly and gives to the hood the movement necessary to throw the preponderance of weight upon the descending side of such hood and cause such hood to make its partial rotation by the action of gravity in uncovering the birds, as aforesaid.

It will be observed that the bolt D and finger E work together, and by pushing down the finger the bolt is moved back out of the way as the hood is swung over the bird, and the projection on the hood acting upwardly against the finger slides the bolt in beneath the edge of the hood, so as to hold the parts firmly in position.

The bolt D is acted upon by any suitable mechanism, but I prefer to connect with the same a wire or wire rope or cord passing through a suitable tube G to the pulley H in a hollow stand I beneath the desk K, within which is a platform L supporting the frame M and shaft N, which shaft is provided with the ratchet-wheel O and pawl P upon a lever Q, the end of which lever passes up through a slot in the top of the desk K, and this lever Q can be moved sufficiently to partially rotate the shaft N to the extent of one tooth of the ratchet-wheel, there being a retaining-pawl R to prevent the ratchet-wheel turning back.

Upon the shaft N is a pin-cylinder S, the pins r of which act upon the keys T, with which the wires or wire ropes e are connected.

It is usual to have five traps placed at suitable distances apart. The number, however, may vary. I have illustrated in Fig. 1 five of such traps leading to the one desk, which desk is advantageously placed in the clubhouse or office of the starter, and in Fig. 3 the five tubes G are represented as leading the wires or ropes e to the hollow stand I containing the pulleys H beneath the desk K, and upon the platform L that supports the frame M, pin-cylinder, and mechanism five keys T are represented, to which the ends of the respective wires e are connected. These wires or ropes e may be attached to the keys T in any suitable manner. I have represented them as passing up through holes in the keys and fastened to blocks 11, to which also are connected the screws 12 that run along the keys through lugs upon such keys and receive the nuts 13, so as to adjust the parts and apply the proper tension to the wires or ropes e; and it will now be apparent that when the pin-cylinder S is partially turned one or more of the pins r will act beneath one or more of the keys T and set off the corresponding traps.

It is advantageous to make the cylinder S movable endwise upon a polygonal shaft, there being a spring-bolt 14 upon the cylinder, the end of which spring-bolt passes into one of the holes or cavities in the shaft N, so that the pin-cylinder can be placed in any desired position upon the shaft N.

The pins r are to be placed in the pin-cylinder S in any desired position, so as to set off the traps in any desired order, and with this object in view it is advantageous to make in the cylinder S ranges of holes corresponding in number with the ratchet-teeth and to make the pins r movable and preferably fitted to screw into these holes. By the aforesaid construction the manager or party having the shooting in charge can prearrange or change the pins r in the cylinder S, so that the traps may be set off in any desired order, and it will be observed that in the pin-cylinder S there are twelve peripheral ranges of holes along the length of the cylinder, and the two ranges 15 and 16 can be filled with pins, or pins may be placed in corresponding pairs of holes, so that two traps can be set off simultaneously, and the pins in the other ranges of holes may be placed in any predetermined position, so as to liberate two, four, or five birds in any desired order, and the cylinder S can be slipped along upon the shaft to bring the desired combination of pins to act upon the respective keys, and where the starter pulls the lever Q at the proper time or at predetermined intervals the birds will be liberated, but the marksman cannot tell beforehand which of the traps will be next operated, and in this manner any collusion or unfairness in the presentation of the birds will be avoided.

It is sometimes desirable to move the pin-cylinder first in one direction and then in the other in such a manner that the party who actuates the lever Q does not know or cannot form an idea as to which of the traps may be set off, and with this object in view the pin-cylinder is moved along progressively first in one direction and then in the other by a stationary plate U, having slots that cross each other similar to sections of a right and left hand screw, and the pin or projection s is provided with a switch t upon the end, and this pin carrying the switch passes through the cylinder and friction is applied to hold the same in position by a spring within the rim of the cylinder acting to draw the shoulder of the pin against the surface of the cylinder, and at the end grooves of the plate U there are cams u that act to change the direction of the switch t. Hence when the cylinder is being rotated it is carried along bodily between one rotation and the next by the switch in one of the inclined grooves of the plate U, and when the pin-cylinder has been moved to the extreme end in one direction one of the cams $u$ acts to turn the switch $t$ into the opposite angular position, so that a continuation of the rotation of the cylinder progressively will cause the cylinder to be moved endwise by the switch passing once each rotation into one of the inclined grooves of the plate U and the cylinder will be moved back to the point of beginning.

When the pin-cylinder is actuated in the manner before described the spring-bolt 14 should have its end beveled in both directions, so as to pass into beveled recesses in the shaft and steady the cylinder from moving endwise, except when the switch is in one of the inclined grooves in the plate U, and exerts sufficient power as the cylinder is rotated to push the cylinder along and cause the spring-bolt to pass out of one of the recesses and engage the next.

When the ranges of pins 15 and 16 are being used for setting off two traps at once the switch $t$ is beyond the end of the grooved plate U and the switch or spring-bolt 14 is in an end recess 25 for holding the pin-cylinder in position, and it is to be understood that the desk or inclosing case is to be opened and the cylinder moved along by hand when the ranges of pins 15 and 16 are brought into action.

I claim as my invention—

1. The combination in a trap for pigeons or other birds, of a box having a rigid top plate for supporting the bird, a semi-circular hood pivoted on the box there being a slot in the top through which the said hood can be swung down into the box, mechanism actuated from a distance for pressing down one edge of the hood into the box to cause it to swing down by gravity and uncover the bird and to strike on the under side of the top plate of the box, substantially as specified.

2. The combination in a trap, of a box having a top plate, a pivoted hood adapted to cover the bird, there being an opening in the top plate through which the pivoted hood can be swung down into the box in uncovering the bird, a bolt for holding the pivoted hood, and a pivoted finger acting to bring down one side of the hood in swinging the same, substantially as set forth.

3. The combination in a trap for pigeons or other birds, of a box having a rigid top plate for supporting the bird, a semi-circular hood pivoted on the box there being a slot in the top through which the said hood can be swung down into the box, mechanism actuated from a distance for pressing down one edge of the hood into the box to cause it to swing down by gravity and uncover the bird and to strike on the under side of the top plate of the box and a spring for holding the hood when swung down into the box, substantially as set forth.

4. The combination in a trap for pigeons or other birds, of a box having a rigid top plate for supporting the bird, a semi-circular hood pivoted on the box, there being a slot in the top through which said hood can be swung down into the box, a bolt for holding the hood and a finger for moving the same, and a connection therefrom by which the bolt and finger can be operated from a distance to unbolt the hood and swing it down into the box, substantially as set forth.

5. The combination with the traps for holding and uncovering the birds, of wires or ropes extending from such traps and by which they are operated, an inclosure or desk into which such wires or ropes are passed, and keys with which they are connected, a pin cylinder for acting upon such keys, and a lever, pawl and ratchet for progressively rotating the cylinder, substantially as set forth.

6. The combination with the trap for holding and uncovering the birds, of wires or ropes extending from such traps and by which they are operated, an inclosure or desk into which such wires or ropes are passed, and keys with which they are connected, a pin cylinder for acting upon such keys, and a lever, pawl and ratchet for progressively rotating the cylinder, the pin cylinder having ranges of holes for the movable pins, substantially as set forth.

7. The combination in an apparatus for actuating traps, of a shaft, a lever, pawl and ratchet wheel for rotating the shaft progressively, a pin cylinder upon such shaft with ranges of holes longitudinally and peripherally, movable pins within such holes, a bolt for holding the cylinder in its proper position upon such shaft, a range of keys acted upon by the pins of the cylinder and connections from such keys to the respective traps, substantially as set forth.

8. The combination in an apparatus for actuating traps, of a shaft, a lever and pawl and ratchet wheel for rotating the shaft progressively, a pin cylinder upon such shaft with ranges of holes longitudinally and peripherally, removable pins within such holes, a spring bolt for holding the pin cylinder in position upon the shaft and automatic means for sliding the cylinder endwise upon the shaft, substantially as set forth.

9. The combination with the traps for holding pigeons or other birds, keys and connections between the traps and the keys, of a cylinder with projections for acting upon the keys and means for rotating the cylinder progressively by hand, substantially as set forth.

10. The combination with the traps for holding pigeons or other birds, keys and connections between the traps and the keys, of a cylinder with projections for acting upon the keys and means for rotating the cylinder progressively by hand and automatic mechanism for moving the cylinder endwise for bringing different ranges of projections upon the cylinder into action upon the keys, substantially as set forth.

11. The combination with the traps for holding pigeons or other birds, of keys and connections between the traps and the keys, a cylinder with projections for acting upon the keys, means for rotating the cylinder progressively by hand, a plate with intersecting grooves inclined in opposite directions, a switch upon the cylinder for engaging the grooves of the plate and moving the cylinder endwise first in one direction and then in the other, substantially as set forth.

Signed by me this 27th day of February, 1895.

JORDAN L. MOTT, JR.

Witnesses:
EDWARD PERPALL,
HENRY MORFORD.